(12) United States Patent
Hummel

(10) Patent No.: US 7,299,730 B2
(45) Date of Patent: Nov. 27, 2007

(54) SAW CALIBRATION WHEEL

(76) Inventor: Joseph S. Hummel, 3 Ringbit Rd. West, Rolling Hills, CA (US) 90274-5241

( * ) Notice: Subject to any disclaimer, the term of this patent is extended or adjusted under 35 U.S.C. 154(b) by 108 days.

(21) Appl. No.: 11/248,118

(22) Filed: Oct. 11, 2005

(65) Prior Publication Data

US 2007/0079682 A1  Apr. 12, 2007

(51) Int. Cl.
*B26D 7/27* (2006.01)
(52) U.S. Cl. .................... 83/522.15; 83/477.2
(58) Field of Classification Search ............. 83/477.2, 83/522.11, 522.15–522.18; 33/201, 202, 33/640; 73/1.75, 1.79, 1.81
See application file for complete search history.

(56) References Cited

U.S. PATENT DOCUMENTS

| | | | |
|---|---|---|---|
| 0,096,224 A | 10/1869 | Grosvenor | |
| 0,420,739 A | 2/1890 | Schmitz | |
| 1,667,100 A * | 4/1928 | Brown | ............ 33/3 B |
| 1,821,113 A | 9/1931 | Neighbour | |
| 2,035,255 A * | 3/1936 | Avery | ............ 318/280 |
| 2,247,811 A * | 7/1941 | Hermann | ............ 200/39 R |
| 2,363,208 A | 11/1944 | Sulzer | |
| 2,673,901 A * | 3/1954 | Kountz | ............ 200/38 A |
| 2,696,854 A | 12/1954 | Woodruff | |
| 2,817,403 A | 12/1957 | Feitl | |
| 2,831,375 A | 4/1958 | Lautiainen | |
| 3,205,586 A | 9/1965 | Mullen | |
| 3,386,482 A | 6/1968 | Nadeau | |
| 3,456,854 A | 7/1969 | Condy | |
| 3,628,496 A | 12/1971 | Schmitt | |
| 3,757,569 A | 9/1973 | O'Brien et al. | |
| 3,924,498 A | 12/1975 | Hill | |
| 4,078,309 A | 3/1978 | Wilson | |
| 4,318,224 A | 3/1982 | Getts | |
| 4,335,768 A | 6/1982 | Bachmann | |
| 4,381,431 A * | 4/1983 | Ritzenthaler et al. | ..... 200/38 R |
| 4,465,114 A | 8/1984 | Schumacher | |
| 4,516,324 A | 5/1985 | Heininger, Jr. et al. | |
| 4,843,728 A | 7/1989 | Francis | |
| 5,010,658 A | 4/1991 | Griffith et al. | |
| 5,513,548 A | 5/1996 | Garuglieri | |
| 5,531,031 A | 7/1996 | Green | |
| 5,632,096 A | 5/1997 | Horvath | |
| 5,720,213 A | 2/1998 | Sberveglieri | |
| 5,810,448 A | 9/1998 | Kingsley et al. | |
| 5,842,400 A | 12/1998 | McIntosh | |
| 5,943,932 A | 8/1999 | Sberveglieri | |
| 6,050,759 A | 4/2000 | Bone | |
| 6,073,359 A * | 6/2000 | Lee | ............ 33/759 |
| 6,101,733 A | 8/2000 | Horvath | |
| 6,263,584 B1 | 7/2001 | Owens | |
| 6,484,711 B2 | 11/2002 | Acker et al. | |
| 6,543,324 B2 | 4/2003 | Dils | |

(Continued)

*Primary Examiner*—Stephen Choi
(74) *Attorney, Agent, or Firm*—Stephen M. Nipper; Dykas, Shaver & Nipper, LLP

(57) ABSTRACT

A calibration disk for use primarily with table saws. In an embodiment, the disk is installed on depth control axle and spaces away from the saw cabinet with a spacing collar. A friction collar provides a frictional engagement between the disk and the axle that may be overcome manually, so that the disk may be zero-set. To set the blade height, the operator rotates the depth control until a line corresponding to the desired cut depth is aligned with an alignment mark affixed to the saw cabinet.

12 Claims, 5 Drawing Sheets

U.S. PATENT DOCUMENTS

| | | |
|---|---|---|
| 6,678,960 B2 | 1/2004 | Williams |
| 6,739,230 B2 * | 5/2004 | Chang ........................ 83/477.2 |
| 6,994,008 B2 * | 2/2006 | Liao et al. ................... 83/477.2 |
| 7,013,574 B2 * | 3/2006 | Plunkett ....................... 33/640 |
| 2002/0189417 A1 * | 12/2002 | Liao et al. ................... 83/477.2 |
| 2004/0129125 A1 | 7/2004 | Colquhoun |
| 2006/0116787 A1 * | 6/2006 | Etter et al. ................... 700/180 |

* cited by examiner

| Depth | 1/16 | 1/8 | 3/16 | 1/4 | 5/16 | 3/8 | 7/16 | 1/2 | 5/8 | 3/4 | 1" |
|---|---|---|---|---|---|---|---|---|---|---|---|
| 10" blade position | 7 | 14 | 20 | 27 | 34 | 41 | 48 | 54 | 7 | 21 | 49 |
| 8" blade position | 7 | 14 | 21 | 28 | 35 | 42 | 49 | 56 | | | |

SAW CALIBRATION WHEEL

FIELD OF THE INVENTION

The invention relates generally to an apparatus for setting the cutting depth of a saw, and more particularly to an instrument for setting the cutting depth of a table saw.

BACKGROUND OF THE INVENTION

The table saw is one of the most common and versatile pieces of woodworking equipment. A typical table saw consists of a saw blade mounted on an arbor and driven by a motor. The blade protrudes through the surface of a table, which provides support for the material being cut.

The depth of the cut often must be set precisely, particularly when cutting a dado or rabbet. In a typical table saw, the depth of the cut is varied by adjusting the blade height: the distance that the cutting edge of the blade protrudes above the table surface. The higher the blade protrudes above the surface, the deeper the cut. In some table saws, the blade and arbor are fixed and the table is moved up and down. In other table saws, the table is fixed and the blade and arbor are moved up and down. The angle of the cut is typically controlled by adjusting the angle of the blade relative to the table.

An operator may control the height of the blade by rotating a control handle, usually in the form of a disk or wheel, which drives a mechanism to lower or raise the saw blade relative to the table. The control handle is commonly mounted on an axle. Typically, table saws present no means for communicating the height of the blade above the table to the operator. Setting the blade height tends to be more difficult for table saws than other machine tools because the relationship between a given rotation of the control handle and a change in the blade height is not constant.

Commonly, the operator will measure the height of the saw blade using one of a variety of devices. One such device is a height gauge which functions much like a caliper, where one leg sits upon the surface of the table and the other sits upon the upper edge of the saw blade. The height is displayed on a dial. Another such device is a calibrated fence. A fence is a movable guide that is used to guide material to be cut through the saw blade. When the saw is stopped, the calibrated fence may be placed next to the blade and the height of the blade adjusted against a scale inscribed in the surface of the fence. Similar devices include scales, tape measures, or step blocks. It is common to have to make several adjustments to get precise results using these devices.

When using any of these devices, the saw must be stopped for the operator to safely read the height of the saw blade. Stopping the saw and applying an external measurement device to measure the height of the blade is both time consuming and prone to error. Furthermore, there is an incentive for an operator to sacrifice safety and adjust the saw blade while it is still spinning.

Another common method is to make a trial cut in a scrap piece of wood. Using this method, the operator makes repeated cuts in a scrap piece, making fine adjustments between each cut and measuring the result. This method is awkward, time consuming, and imprecise.

Accordingly, there is a need for an easy to use way to adjust the height of the saw blade accurately and to make fine height adjustments while the saw is spinning. Furthermore, any adjustment device should be inexpensive and easy to install.

The same needs exists for many machine tools, such as routers. In a table saw, the blade depth is directly related to the cutting depth. In other tools, the cutting depth is indirectly related to the distance from the cutting edge to the table, but the principle problems are the same. Throughout this specification, cutting depth and blade height are used interchangeably when referring to table saws.

SUMMARY OF THE INVENTION

An embodiment of the invention includes a calibrated disk that is positioned behind the control handle that raises and lowers the saw blade. The calibrated disk has marks inscribed in the surface and may be rotated independently of the handle to "zero" the dial. When the saw is not operating, the saw blade is typically "parked" in a position where the blade is below the top surface of the table. In operation, the control handle is rotated to raise the saw blade level with the top surface of the table. With the control handle held motionless, the disk is rotated until the zero reference mark is opposite an alignment mark. The control handle is then rotated until a reference line on the disk corresponding to the desired height is opposite the alignment mark. The disk may be frictionally secured to the axle so that it rotates with the axle while making a height adjustment, yet may be manually zeroed.

The calibrated disk may be added to an existing table saw or tool merely by removing the control handle, which generally requires removal of only one set screw. The calibrated disk may be quickly and easily installed on the control axle, and the control handle re-installed.

The purpose of the foregoing summary is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The summary is neither intended to define the invention of the application, which is measured by the claims, nor is it intended to be limiting as to the scope of the invention in any way.

Still other objects and advantages of the present invention will become readily apparent to those skilled in this art from the following detailed description wherein only the preferred embodiments of the invention are shown and described, simply by way of illustration of the best mode contemplated by carrying out the invention. As will be realized, the invention is capable of modification in various obvious respects all without departing from the invention. Accordingly, the drawings and description of the preferred embodiment are to be regarded as illustrative in nature, and not as restrictive in nature. The objects and advantages of the invention may be realized and attained by means of the instrumentalities and combinations particularly pointed out in the appended claims.

DESCRIPTION OF THE PREFERRED EMBODIMENTS

Figure 1:
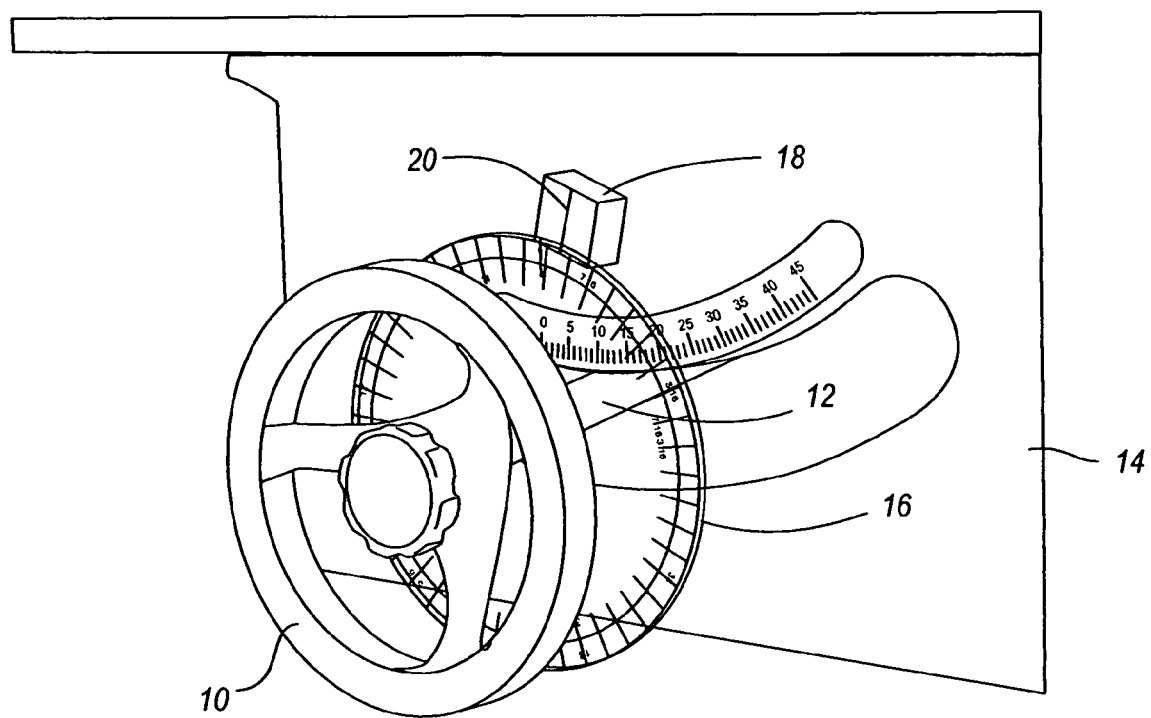
FIG. 1 is a side, perspective view of an embodiment of the invention installed on a table saw.

While the invention is susceptible of various modifications and alternative constructions, certain embodiments thereof have been shown in the drawings and will be described below in detail. It should be understood, however, that there is no intention to limit the invention to the specific form disclosed; rather, the invention is to cover all modifications, alternative constructions, and equivalents falling within the spirit and scope of the invention as defined in the claims. For example, while embodiments of the present invention were developed for a table saw, the invention is not limited to use with table saw and may be used with other saws, woodworking equipment, or machine tools, such as routers. While the invention is not limited to use with saws, it is expected that various embodiments of the invention will be particularly useful in such devices.

FIG. 1 shows an embodiment of the invention installed on a table saw. The operator controls the height of the saw blade using a control handle 10, which sets the position of the saw arbor through a mechanism (not shown). A control axle 12 (see FIG. 2) extends from control handle 10 through a saw cabinet 14. A disk 16 is installed on the axle so that as control handle 10 turns, disk 16 spins with the axle 12. An alignment block 18 is inscribed with one or more alignment marks 20 and attached to cabinet 14 so that alignment marks 20 can be viewed either adjacent to or through disk 16.

Figure 2:
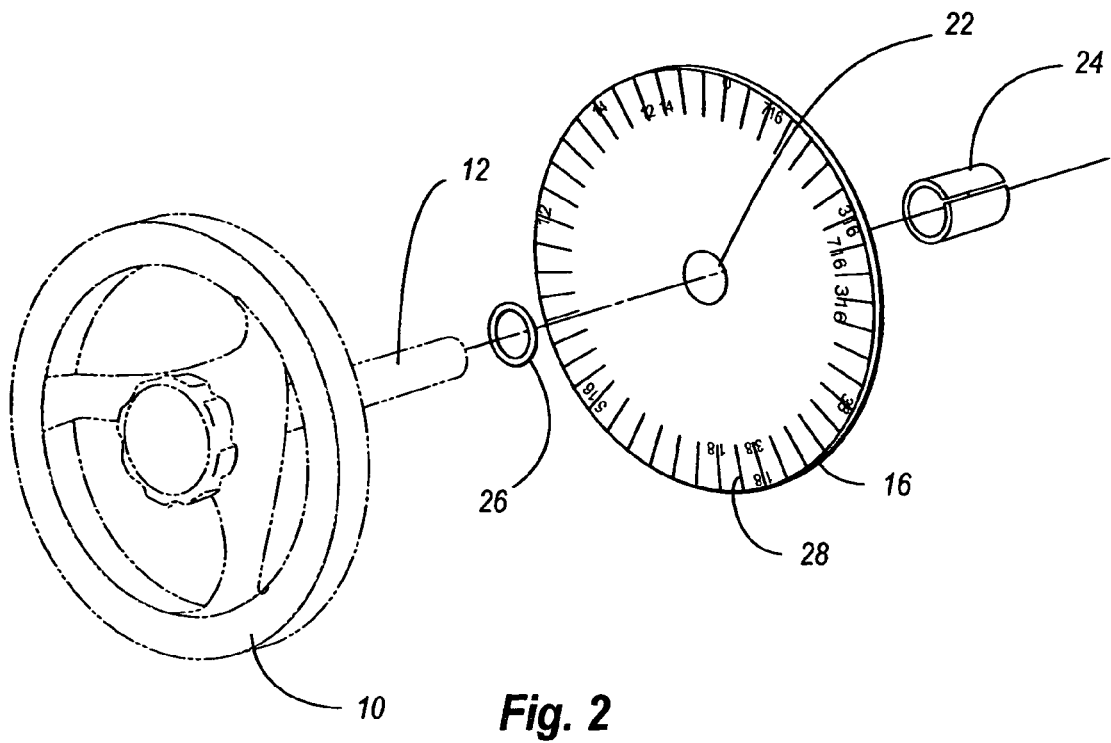
FIG. 2 is an exploded view of an embodiment of the invention.
Figure 4:
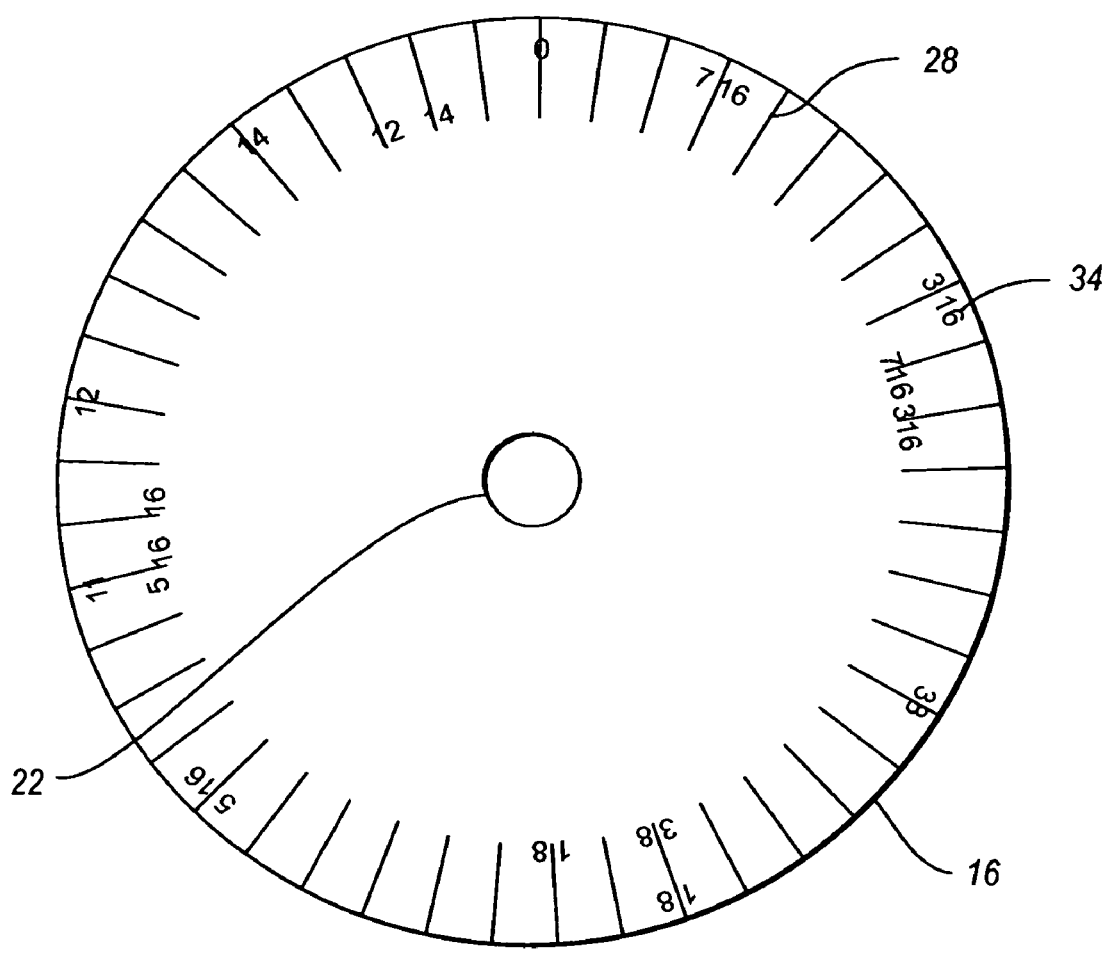
FIG. 4 is a detail view of a disk constructed according to an embodiment of the invention.

FIG. 2 shows an exploded view of an embodiment of the invention installed on the axle 12. Disk 16 has a central passageway 22 large enough to allow disk 16 to spin freely on axle 12. A spacing collar 24 fits over axle 12 between disk 16 and the wall of cabinet 14 (FIG. 1). The outer diameter of spacing collar 24 is larger than the diameter of passageway 22. A friction collar 26 fits securely on axle 12 and abuts disk 16, pressing disk 16 against spacing collar 24. Disk 16 is inscribed with one or more distance marks 28. Distance marks 28 are shown as radial lines; however, points, carets, or any other mark suitable for aligning disk 16 may be used. For ease of setting commonly used cut depths, distance marks 20 corresponding to particular blade heights may be identified by one or more labels 34 inscribed on disk 16 (FIG. 4).

As can be seen in FIG. 2, installation of disk 16, friction collar 26, and spacing collar 24 requires only that control handle 10 be removed from axle 12, typically requiring loosening a set screw (not shown) in control handle 10. No cutting or drilling of holes in the table saw is required. After removal of control handle 10, disk 16, friction collar 26, and spacing collar 24 are slid onto axle 12, and control handle 10 may then be re-installed.

Figure 3:
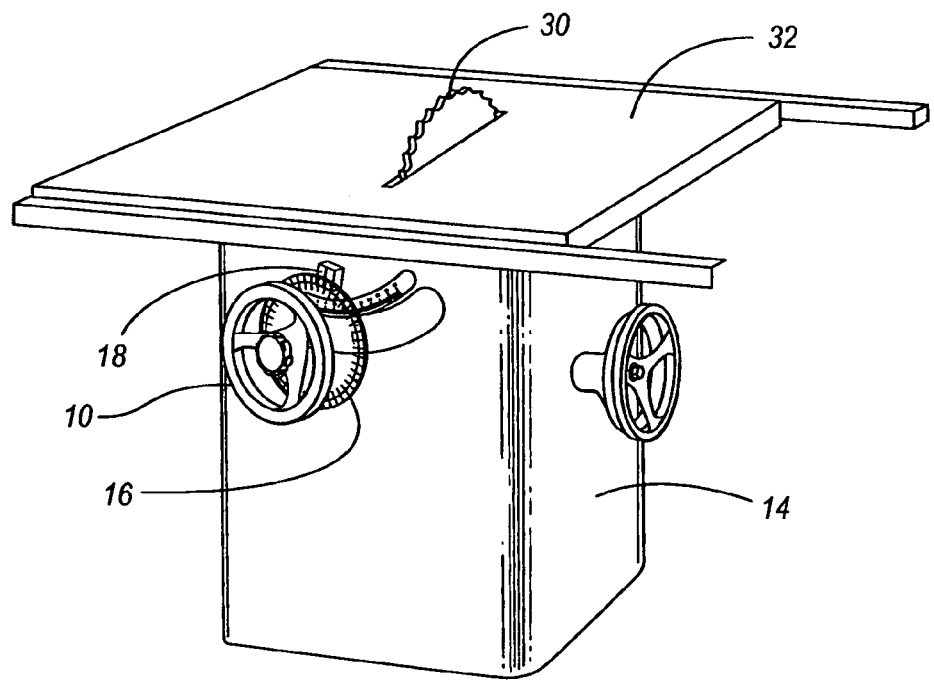
FIG. 3 is a perspective view of an embodiment of the invention installed on a table saw.

An embodiment of the invention installed on a table saw is shown in FIG. 3. In a typical table saw, saw blade 30 protrudes through the material support surface 32, also called a saw table. To set the blade height, the operator should first "zero" disk 16. "Zeroing" means that disk 16 is positioned so that it reads zero when saw blade 30 is at a height where it would contact any material on material support surface 32, but without cutting the material when saw blade 30 rotates. The operator zeroes disk 16 by rotating handle 10 to withdraw the saw blade 30 through the material support surface 32 until the top of the saw blade and the outermost cutting edge of the saw blade is flush with the top surface of material support surface 32. The operator then rotates disk 16 until a distance mark 28 corresponding to a zero position opposes alignment mark 20. Referring again to FIG. 2, it can be seen that friction collar 26 presses disk 16 against spacing collar 24. The operator may rotate disk 16 while holding handle 10 still, overcoming the static friction provided by friction collar 26. When the operator turns handle 10 without grasping disk 16, the static friction provided by friction collar 26 rotates disk 16 in concert with axle 12.

To make a cut of a given depth, the operator rotates handle 10 until a first desired distance mark 28 is opposite alignment mark 20. After making a first cut, the operator may change the cut depth merely by rotating handle 10 until a second desired distance mark 28 aligns with alignment mark 20. Also, disk 16 may be calibrated so that fine, predictable results may be obtained. In this way, the operator can make a series of cuts of differing depth quickly and easily without stopping rotation of the saw blade. In contrast, using ordinary methods, the operator must stop the saw blade for each cut depth and use a gauge to adjust the saw blade height, or make a series of cuts in a scrap piece using a trial and error method. In table saws, the blade height is a direct proxy for cutting depth; in other machine tools, the distance from the cutting edge to the material support surface sets the cutting depth.

On most saws, control handle 10 must be rotated more than 360 degrees to position the blade to the desired height. In this situation, the desired distance mark 28 will pass by alignment mark 20 one or more times before alignment on the final rotation. The final rotation may be determined by visually examining the height of blade 30. In another embodiment, labels 34 are placed at different radii, each radius corresponding to a different number of rotations of control handle 10 from the zero setting.

On most table saws, unlike many machine tools, the relationship between the rotation of handle 10 and the corresponding change in the height of blade 30 is nonlinear, meaning that the change in the height of blade 30 for a given angle of rotation of handle 10 is not constant; rather, the rate of change varies with the initial height. In some table saws, the arbor is mounted on an arm that rotates about a point to change the position of the arbor; thus, the height of blade 30 depends on the sine of the angle of the arm relative to the material support surface 32. In other saws, the relationship is more complex. In any case, the relationship can be calculated or discovered empirically. The position of marks 28 on disk 16 must be adjusted to accommodate this non-linear relationship, or the marks 28 must be identified with the appropriate labels 34 according to the relationship.

Disk 16 may be opaque or clear, to provide additional ease in aligning a mark 28 with the alignment mark 20. In addition, when disk 16 is clear, other scales and features on the saw behind the handle are visible to the operator. Marks 28 and labels 34 may be etched into the surface of the disk, printed or applied with any means appropriate to make a permanent mark. Labels 34 may contain numeric characters, alphanumeric characters, symbols or glyphs.

Friction collar 26 may be made of an elastic or fibrous material and may be formed in the shape of an o-ring. Alternatively, friction collar 26 may fit within passageway 22 so that it is captured between the edge of passageway 22 and axle 12.

Spacing collar 24 may be rigidly secured to the control axle 12, as in a ring with a set screw. Alternatively, many table saws are manufactured with a ring rigidly attached to the control axle, and spacing collar 24 may be sized to contact both this ring and disk 16, thus spacing disk 16 away from cabinet 14. In this embodiment, spacing collar 24 may be made with any flexible material and may be slotted so that the spacing collar can be snapped around axle 12 without removing axle 12 from the saw.

Alignment block 18 may be constructed of any suitably durable material and may be affixed to cabinet 14 magnetically or with an adhesive. Alignment mark 20 may be etched, printed or otherwise inscribed in the surface of block 18. Alternatively, alignment block 18 may be replaced by a label adhesively attached to the surface of cabinet 14. In another embodiment, alignment mark 20 may be inscribed directly on the surface of cabinet 14.

FIG. 4 shows an embodiment of disk 16 constructed for use with a particular saw. The relationship between the position of control handle 10 and the height of the outermost edge of saw blade 30 above material support surface 32 depends on the diameter of saw blade 30. Similarly, the relationship between turns of control handle 10 and the height of saw blade 30 depends on the details of the mechanism that sets the arbor position, which varies by saw manufacturer. Thus, the distance mark 28 corresponding to a given cut depth or blade height will vary with blade diameter and saw manufacturer. As shown in FIG. 4, disk 16 is inscribed with one or more numeric labels 34 corresponding to a particular blade height or cut depth for a given saw blade diameter and saw manufacturer. A separate disk 16 may be provided with appropriate labels 34 and distance marks 28 for each combination of saw diameter and saw manufacturer. FIG. 4 shows a disk 16 constructed with adjacent marks 28 approximately 6 degrees apart, corresponding to a change in cut depth of approximately 0.005 inches. However, disk 16 may be constructed to calibrate changes in cut depth as small as 0.002 inches. The operator may need to take care to make changes in one direction, so that backlash in the saw mechanism does not contribute to error in the cut depth. Alternatively, a vernier scale having marks designating graduations to either side of mark 20 may be added to alignment block 18, so that adjustments as small as 0.002 inches may be made. To use the vernier scale, the operator selects the distance mark 28 corresponding to the blade height that is closest to the desired blade height, and selects the graduation that corresponds to the difference between the desired blade height and the height represented by the selected distance mark 28. The operator then aligns the selected distance mark 28 with the selected graduation mark.

Figures 5, 6:
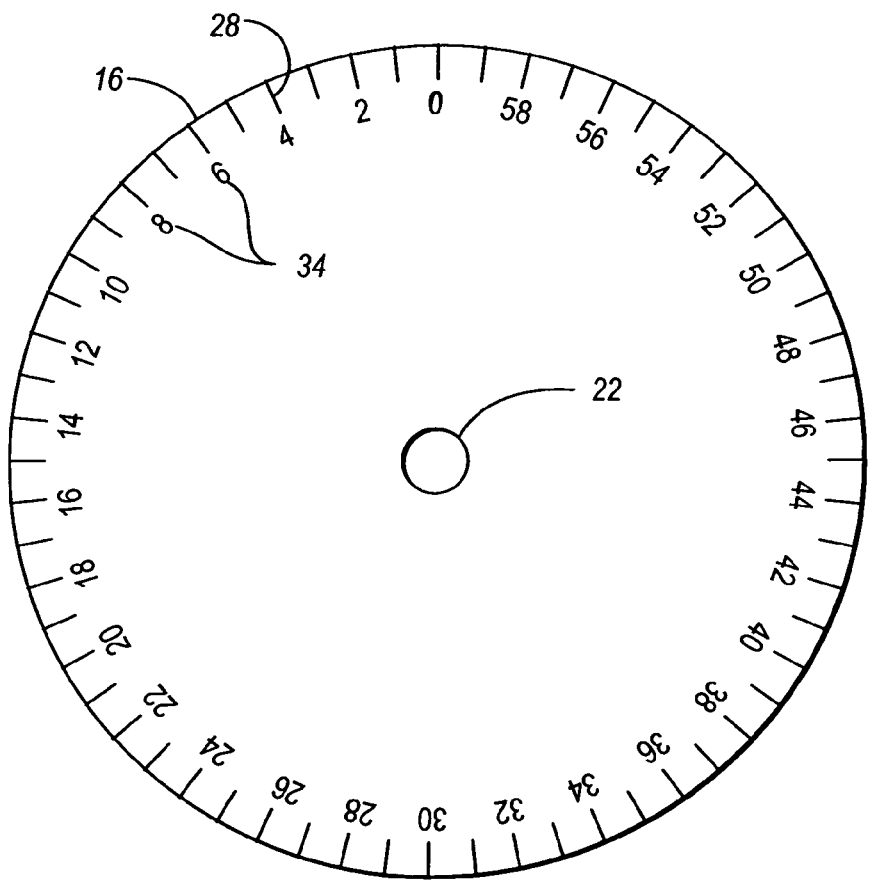
FIG. 5 shows a reference table constructed according to an embodiment of the invention.
FIG. 6 is a detail view of a disk constructed according to an embodiment of the invention to be used with the reference table shown in FIG. 5.

In a preferred embodiment, labels 34 on disk 16 may correspond to entries in a table. An example of such a table is shown in FIG. 5. Table 36 has columns 38 corresponding to cut depth or blade height, and rows 40 corresponding to different blade diameters. For example, 8 inch diameter blades are commonly used for dado cuts, and 10 inch diameter blades are commonly for general purpose cuts. The entries at the intersections of columns 38 and rows 40 correspond to marks 28 on a disk 16, as shown in FIG. 6. For convenience, the marks 28 may be identified by one or more labels 34. To use table 36, the operator selects the entry at the intersection of the desired cut depth in column 38 and the appropriate blade diameter in row 40. The selected entry corresponds to a particular distance mark 28. The operator rotates handle 10 until the distance mark 28 corresponding to the selected table entry oppose alignment mark 20. Table 36 may be affixed to the cabinet 14 of the table saw or distributed separately as a booklet, card, adhesive label, or the like. Table 36 may be pre-printed with data corresponding to a particular saw manufacturer and blade diameters, or table 36 may be provided with blank entries so that the operator can measure the characteristics of a particular saw and blade combinations and enter the corresponding data.

Table 36 may be expanded to accommodate additional rows for different manufacturers of table saws. For example, a first set of rows may contain an 8 inch blade row and a 10 inch blade row for a first manufacturer A, and a second set of rows may contain an 8 inch blade row and a 10 inch blade row for a second manufacturer B. While rows correspond to blade diameter and manufacturer and columns correspond to blade height or cut depth in the exemplary embodiment, any assignment of rows and columns to blade height, blade diameter, and manufacturer may be made to construct table 36.

In another embodiment, disk 16 may be inscribed with a first series of labels displaying numbers corresponding to a particular blade height, and a second series of labels corresponding to entries in table 36.

Figure 7:
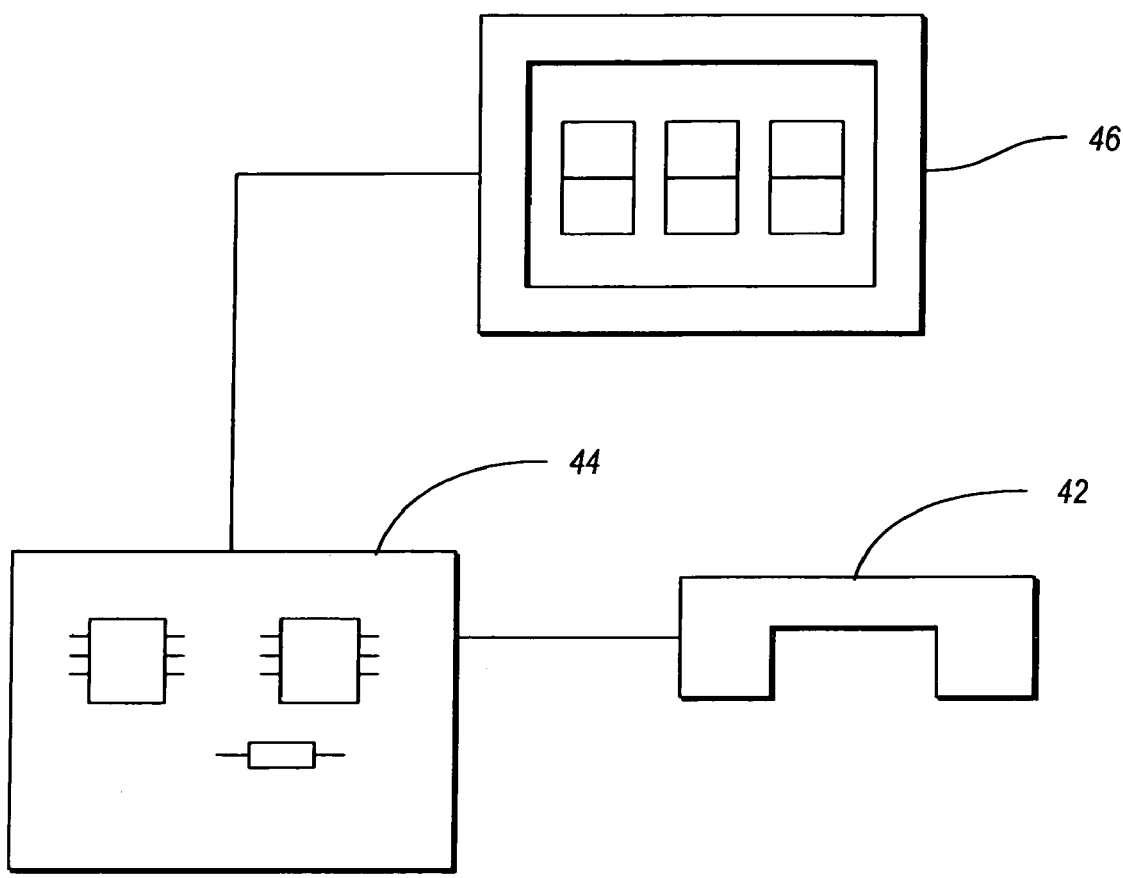
FIG. 7 shows an embodiment of the invention wherein the blade height is displayed electronically.

In some applications, it may be desirable to display the selected cutting depth electronically. In an alternative embodiment, disk 16 may be encoded with electronically readable indicia. In a preferred embodiment, the indicia are printed on disk 16, appearing as electronically readable marks corresponding to distance marks 28. Referring to FIG. 7, a sensor 42 reads the indicia to produce data corresponding to the angular position of disk 16. Electronic circuitry 44 processes the data and displays the blade height or cutting depth on a display 46. Display 46 may be mounted anywhere on cabinet 14 easily viewable by the operator. Sensor 42 may be an optical sensor, a magnetic sensor, or any sensor capable of reading the angular position of disk 16. If sensor 42 is a magnetic sensor, the indicia may be printed in magnetically readable ink, similar to that used on checks. Electronic circuitry 44 may comprise a computer and memory, and preferably is capable of accounting for the total number of rotations made by disk 16 after disk 16 is zeroed by the operator. Display 46 may be a liquid crystal display, electroluminescent display, or similar display capable of presenting a cutting depth to the operator, and preferably displays numeric data.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A device for setting a table saw to a desired cutting depth, the table saw having a control handle mounted on a control axle, a material support surface, a cabinet, and a cutting edge lying on the outermost circumference of a saw blade, comprising:
   a disk defining a passageway configured for the passage of the control axle, the disk comprising:
   a zero distance mark corresponding to a cutting depth of zero when the cutting edge is flush with the material support surface; and
   a first distance mark corresponding to a first distance from the cutting edge to the material support surface;
   an alignment mark in a fixed position relative to the cabinet; and a friction collar adapted to provide a static frictional fit between the axle and the disk so that rotation of the control handle results in rotation of the disk, wherein the static frictional fit is configured to be overcome by rotating the disk while holding the handle still to prevent rotation of the control axle;

whereby the disk is aligned by rotating the handle to bring the cutting edge flush with the material support surface and then holding the handle still while rotating the disk until the zero distance mark is aligned with the alignment mark, and whereby rotation of the control handle causes said first distance mark to be brought into alignment with said alignment mark, thereby resulting in said cutting edge being adjusted to a predetermined cutting depth.

2. The device of claim 1, wherein the friction collar fits within the passageway.

3. The device of claim 1, wherein the friction collar comprises an o-ring.

4. The device of claim 1, wherein the alignment mark is inscribed on a block magnetically attachable to the cabinet.

5. The device of claim 1, further comprising a spacing collar between the disk and the cabinet, wherein the spacing collar prevents the disk from contacting the cabinet.

6. The device of claim 5, wherein the spacing collar circumvolves the axle.

7. The device of claim 1, wherein the disk further comprises a numeric inscription describing a particular cut depth.

8. The device of claim 1, wherein the disk further comprises a numeric inscription describing a particular distance from the cutting edge to the material support surface.

9. The device of claim 1, further comprising:
a symbol inscribed on the disk near the first distance mark; and
a table relating the symbol to the first distance;
whereby the machine tool is set to the first distance when the distance mark is aligned with the alignment mark.

10. The device of claim 9, wherein the table relates the symbol to a plurality of distances, each distance corresponding to a saw blade diameter.

11. The device of claim 9, wherein the table relates the symbol to a plurality of distances, each distance corresponding to a machine tool manufacturer.

12. A device for adjusting the blade height of a table saw having a control handle mounted on a control axle, a material support surface, a cabinet, saw blade, comprising:

a disk defining a passageway configured for the passage of the control axle, the disk comprising:
a zero mark inscribed on the disk corresponding to a cutting depth of zero when the cutting edge is flush with the material support surface;
a plurality of distance marks inscribed on the disk; and
a plurality of symbols inscribed on the disk near each distance mark;

an alignment mark in a fixed position relative to the cabinet;

a friction collar adapted to provide a static frictional fit between the axle and the disk so that rotation of the control handle results in rotation of the disk, wherein the static frictional fit is configured to be overcome by rotating the disk while holding the handle still to prevent rotation of the control axle; and a table relating the plurality of symbols to a plurality of cutting depths, each cutting depth corresponding to a saw blade diameter and a saw manufacturer;

a symbol inscribed on the disk near the first distance mark;

a table relating the symbol to the first distance;

whereby the machine tool is set to the first distance when the distance mark is aligned with the alignment mark;

whereby the disk is aligned by rotating the handle to bring the cutting edge flush with the material support surface and then holding the handle still while rotating the disk until the zero mark is aligned with the alignment mark, and whereby the cutting edge of the table saw is thus able to be adjusted to a desired cutting depth by rotating the control handle until the alignment mark is aligned with the particular distance mark near the particular symbol that the table relates to the desired cutting depth.

* * * * *